US010877575B2

(12) United States Patent
Berger, Jr. et al.

(10) Patent No.: US 10,877,575 B2
(45) Date of Patent: Dec. 29, 2020

(54) CHANGE OF ACTIVE USER OF A STYLUS PEN WITH A MULTI USER-INTERACTIVE DISPLAY

(71) Applicant: Microsoft Technology Licensing, LLC, Redmond, WA (US)

(72) Inventors: Roy H. Berger, Jr., Seattle, WA (US); Gregg Robert Wygonik, Duvall, WA (US); Hayden William McAfee, Redmond, WA (US); Christian Klein, Duvall, WA (US); Ken M. Sadahiro, Redmond, WA (US); Alain Philippe Maillot, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 15/451,115

(22) Filed: Mar. 6, 2017

(65) Prior Publication Data

US 2018/0253163 A1    Sep. 6, 2018

(51) Int. Cl.
| | | |
|---|---|---|
| G06F 3/0354 | (2013.01) |
| G06N 3/00 | (2006.01) |
| G06N 5/04 | (2006.01) |
| G06F 3/048 | (2013.01) |
| G06F 40/171 | (2020.01) |

(52) U.S. Cl.
CPC .......... *G06F 3/03545* (2013.01); *G06F 3/048* (2013.01); *G06F 40/171* (2020.01); *G06N 3/006* (2013.01); *G06N 5/043* (2013.01)

(58) Field of Classification Search
CPC .... G06F 17/242; G06F 3/03545; G06F 3/048; G06N 3/006; G06N 5/043
See application file for complete search history.

(56) References Cited

U.S. PATENT DOCUMENTS 6,307,956 B1   10/2001   Black
9,201,520 B2 *  12/2015   Benko .................. G06F 3/0346
(Continued)

FOREIGN PATENT DOCUMENTS

WO    2015191410 A1    12/2015

OTHER PUBLICATIONS

Microsoft Reports: 115; Microsoft Invents Fingerprint ID for the Stylus & More—Patently Mobile Jul. 31, 2013, 7 pages.
(Continued)

*Primary Examiner* — Amy Onyekaba
(74) *Attorney, Agent, or Firm* — Alleman Hall Creasman & Tuttle LLP

(57) ABSTRACT

In a multi-user, collaborative environment, an operating system state change can occur by passing a stylus pen from one user to another. Upon detecting a change of the active user, a state machine transition can result in a change in a user experience. In one example, a change in the user experience includes a change in user interface (UI) functionality. Some examples include changing color of the digital ink being displayed, changing a handwriting pattern, and automatically switching a view displayed on the user interface. The switched view can be switching from a single-user model to a multi-user model. In another example, a state machine transition can result in establishing connections between devices (e.g., phones or laptops) associated with the users that used the pen.

19 Claims, 12 Drawing Sheets

(56) References Cited

U.S. PATENT DOCUMENTS

| | | | |
|---|---|---|---|
| 9,727,161 B2* | 8/2017 | Hinckley | G06F 3/0416 |
| 9,870,083 B2* | 1/2018 | Hinckley | G06F 3/03545 |
| 2005/0024346 A1* | 2/2005 | Dupraz | G06F 3/03545 |
| | | | 345/179 |
| 2005/0180618 A1* | 8/2005 | Black | G06K 9/00 |
| | | | 382/124 |
| 2006/0215886 A1 | 9/2006 | Black | |
| 2006/0244719 A1* | 11/2006 | Brigham, II | G06F 3/03542 |
| | | | 345/156 |
| 2010/0289742 A1* | 11/2010 | Pearce | G06F 3/0412 |
| | | | 345/157 |
| 2011/0248941 A1* | 10/2011 | Abdo | G06F 3/0488 |
| | | | 345/173 |
| 2011/0258566 A1* | 10/2011 | Oustiougov | G06F 3/0483 |
| | | | 715/766 |
| 2012/0229428 A1* | 9/2012 | Tavakoli | G06F 3/03545 |
| | | | 345/179 |
| 2013/0017525 A1* | 1/2013 | Nguyen | G09B 7/00 |
| | | | 434/353 |
| 2013/0017526 A1* | 1/2013 | Nguyen | G09B 19/02 |
| | | | 434/362 |
| 2013/0080931 A1* | 3/2013 | Sirpal | G06F 3/0484 |
| | | | 715/761 |
| 2013/0120249 A1* | 5/2013 | Im | G06F 3/011 |
| | | | 345/157 |
| 2013/0181953 A1 | 7/2013 | Hinckley et al. | |
| 2013/0311482 A1* | 11/2013 | Schleier-Smith | |
| | | | G06F 16/2272 |
| | | | 707/746 |
| 2014/0149880 A1* | 5/2014 | Farouki | H04L 12/1822 |
| | | | 715/748 |
| 2014/0253467 A1* | 9/2014 | Hicks | G06F 3/03545 |
| | | | 345/173 |
| 2015/0022480 A1* | 1/2015 | Case | G06F 3/0488 |
| | | | 345/174 |
| 2015/0049010 A1* | 2/2015 | Locker | G06F 3/0481 |
| | | | 345/156 |
| 2015/0062448 A1* | 3/2015 | S. | G06F 3/041 |
| | | | 349/12 |
| 2015/0286810 A1 | 10/2015 | Lebert | |
| 2015/0363034 A1* | 12/2015 | Hinckley | G06F 3/04883 |
| | | | 345/173 |
| 2015/0363035 A1* | 12/2015 | Hinckley | G06F 3/0416 |
| | | | 345/173 |
| 2016/0098162 A1* | 4/2016 | Qian | G06F 3/0483 |
| | | | 715/753 |
| 2016/0117515 A1 | 4/2016 | Black et al. | |
| 2016/0259516 A1* | 9/2016 | Kudurshian | G06F 3/0487 |
| 2017/0285758 A1* | 10/2017 | Hastings | G06F 3/04842 |
| 2018/0088795 A1* | 3/2018 | Van Os | H04W 4/029 |
| 2018/0188836 A1* | 7/2018 | Park | G06F 3/03545 |
| 2019/0102014 A1* | 4/2019 | Gur | G06F 3/0412 |

OTHER PUBLICATIONS

"International Search Report and Written Opinion Issued in PCT Application No. PCT/US2018/019553", dated Jul. 3, 2018, 10 Pages.

* cited by examiner

DETAILS OF SIGNAL PROCESSING CIRCUITRY

FIG. 9
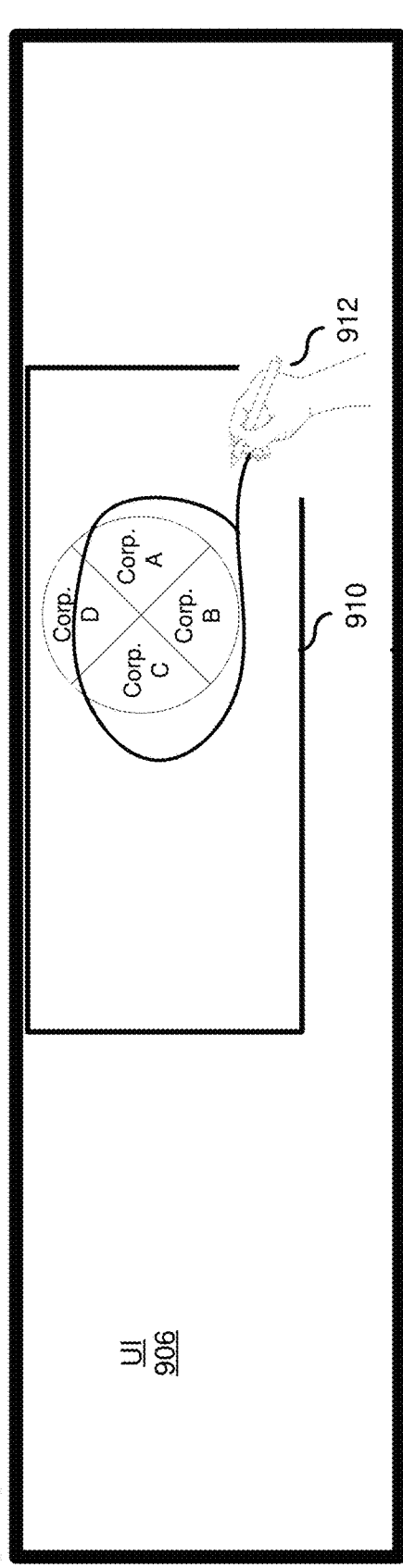
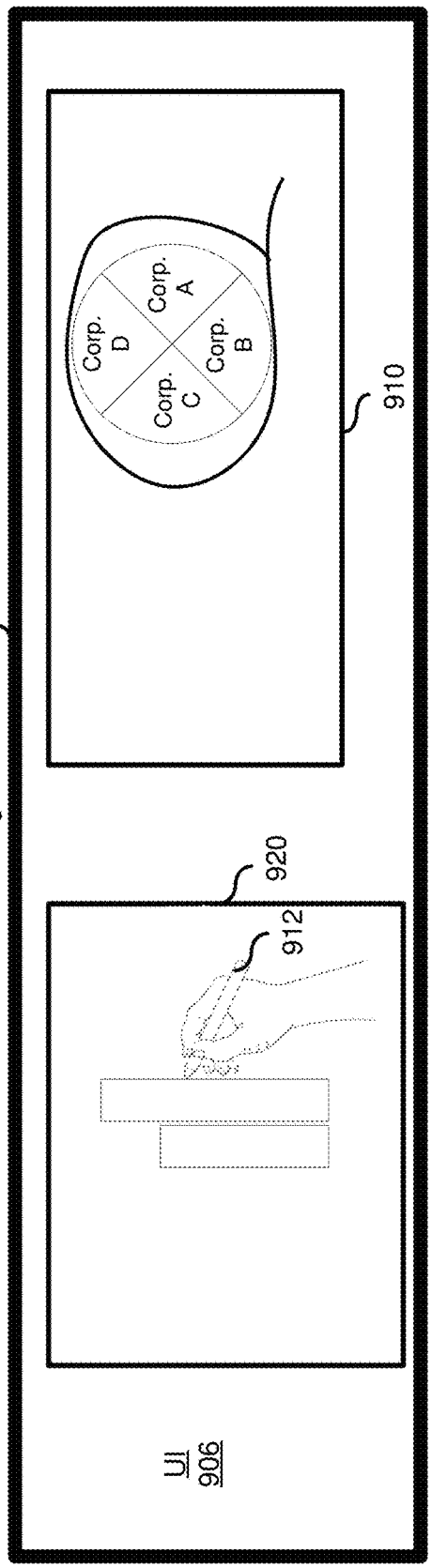

CHANGE OF ACTIVE USER OF A STYLUS PEN WITH A MULTI USER-INTERACTIVE DISPLAY

BACKGROUND

A stylus or a stylus pen is often used as an input device to a digitizer associated with a computer screen, mobile device, graphics tablet, and other devices. With touchscreen devices, a user places a stylus on the surface of the screen to write, draw, or make selections by tapping the stylus on the screen. As such, the stylus is used as a pointing device in addition to a mouse, track pad, or finger.

Stylus pens can be used in a collaborative environment, such as on a multi-user display, also called an interactive whiteboard. An interactive whiteboard is a large digital display that can receive multiple users' input simultaneously. For example, users can use a stylus pen, touch, or a combination of pen and touch on the digital display to have more natural interactions with data, which are not possible on a traditional whiteboard. Additionally, in traditional whiteboards, it is common to pass a marker from one user to another as each person takes a turn presenting and writing on the white board using the marker. Such interactions between users have not been integrated into the collaborative environment of an interactive whiteboard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method is disclosed for interacting with a multi-user display. A detection can be made that a first user of a stylus pen has handed the stylus pen to a second user. In response to the pen handoff, a user experience adaptation is made by changing functionality associated with the multi-user display. For example, User Interface (UI) behavior can be modified based on the handoff. In one example, the UI can go from a single-user mode to a shared mode (i.e., a multi-user mode). In the multi-user mode, a new application window can be opened wherein shared content between the users is displayed. Another example is that the UI interaction model can be modified, such as how applications are launched, how windowing is performed, etc. One example, is that upon a pen handoff, any subsequent keyboard entries are directed to the shared application windows, rather than the previous user interface context.

In other embodiments, relationships between the users can be automatically established due to the pen handoff. For example, communication channels can be automatically established between personal devices of the users, such as between laptops or phones of the users. Relationships can also be established automatically on social media by connecting the users involved in the pen handoff.

In still other embodiments, the pen handoff can impact how digital agents are utilized during a meeting. For example, Artificial Intelligence (AI) agents can treat an active user of the stylus pen differently than other users in a meeting environment. A simple example is that the active user can be interpreted as a leader of the conversation and agenda items, events to calendar, etc. can be given priority for the active user over the participants in a meeting.

The foregoing and other objects, features, and advantages of the invention will become more apparent from the following detailed description, which proceeds with reference to the accompanying figures.

BRIEF DESCRIPTION OF THE DRAWINGS

FIG. 9 is an example showing how the user interface interaction model can be modified in response to a pen handoff.

DETAILED DESCRIPTION

Overview

In a multi-user, collaborative environment, an operating system state change can occur simply by passing a stylus pen from one user to another. Upon detecting a change of the active user, a state machine transition can result in a change in a user experience. In one example, a change in the user experience includes a change in user interface (UI) functionality. Some examples include changing color of the digital ink being displayed, changing a handwriting pattern to make a user's handwriting more legible (e.g., consistent, or in a legible font), automatically switch a view displayed on the user interface, etc. The switched view can be switching from a single-user model to a multi-user model. In another example, a state machine transition can result in establishing connections between devices (e.g., phones or laptops) associated with the users that used the pen. For example, when a pen handoff occurs, it can impact which devices are shared with the main operating system of the multi-user display. Additionally, a pen handoff can result in a social network connection between users. In still a further example, a person holding the stylus pen is considered the leader of the conversation and digital agents (Artificial Intelligence (AI) agents) can provide the leader with an elevated status level. For example, the leader can direct action items to be taken in meeting notes, whereas others within a meeting have a different status level. Additionally, or alternatively, the AI can establish different roles for the person holding the stylus pen, past holders of the stylus pen, and other participants that have not used the stylus pen. These and other examples are further illustrated below in relation to the figures.

Figure 1:
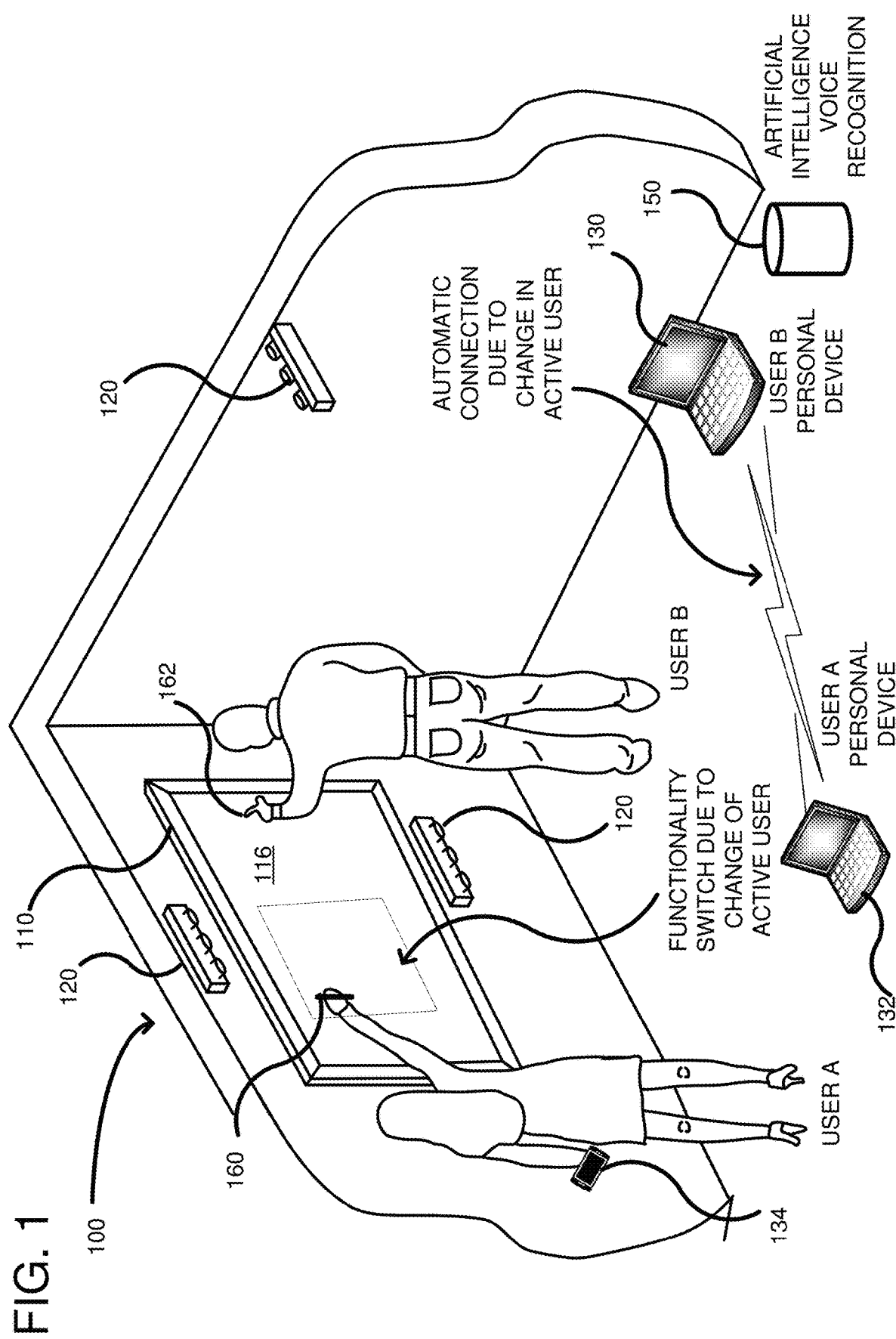
FIG. 1 is a diagram of a collaborative environment in which users are interacting with a multi-user display.

FIG. 1 shows an example interactive display environment 100. In this case, the environment includes an interactive multi-user digital display 110. The interactive multi-user display is one wherein multiple input devices can be used simultaneously by different users. For example, in such a display there can be two or more application windows in-focus simultaneously (accepting user input). Additionally, the multi-user display can have different log-ins for the different users working on the multi-user display simultaneously. One or more users (shown as User A and User B) can participate in an interactive experience using the multi-user display 110. The multi-user display can include a multi-user interactive display screen 116, digitizer hardware (not shown, but described in FIG. 3) and processing hardware (not shown, but described in FIGS. 4 and 5) and multiple sensors, such as sensor 120. The display screen can be any of a variety of screens, including, but not limited to light emitting diode (LED) screens, liquid crystal screens, electroluminescent screens, plasma screens, and/or other developing or yet to be developed display and screen types.

The sensors 120 can include one or more cameras for capturing a region in front of the multi-user display. The cameras can be configured for visible light, infrared, and/or other frequencies. The cameras may operate in conjunction with an infrared pattern projector that assists the cameras to distinguish objects. Other camera configurations can use time of flight or other techniques to enhance information captured by the cameras about the user(s) and/or the environment. In one implementation, the sets of sensors can be Kinect® brand sensing technology offered by Microsoft-.RTM® Corp. Additionally, the sensors 120 can include audio hardware for capturing voices interacting with the display 110. Other types of sensors can be used, such as pressure sensors integrated into the screen 116. Any number of desired sensors can be used for detecting user engagement with the multi-user display, including assisting in detecting when a pen handoff occurs and assisting to identify which user is the active user. Differing levels of detection can be used to identify a user. For example, camera and voice identification can be considered a low-level identification, whereas a fingerprint recognition by the stylus pen can be a high-level identification of a user. Once a user has been detected, the sets of sensors 120 can track the user's position relative to the screen 116 and movements can be tracked to detect a stylus pen handoff or to determine if the user is attempting a user command, such as writing on the screen, making a control gesture, etc.

The environment 100 is intended to represent a meeting environment. In such an environment, each user can bring a personal device 130, 132 to the meeting. In this example, personal devices 130, 132 are laptop computers, but other mobile devices are also typically brought to meetings, such as a mobile phone 134. These personal devices 130, 132, 134 can be used to enter commands or content into the display 110 or to assist in identifying the user. Identification of a particular user can be accomplished by identification signals being sent, such as by Bluetooth or other communication protocols, from the user's personal device. Such signals can be received by the sensors 120, the display itself 110, or other devices within the meeting room, such as an AI front end 150. The AI front end can be used in conjunction with a backend server computer (not shown) to perform cloud-based functionality, such as taking meeting notes, adding calendar events, etc. The AI front end is described further below in FIG. 6

Users can interact with the multi-user display simultaneously and using multiple input devices. For example, User A is shown using a stylus pen 160, whereas User B is entering data using touch commands, as shown at 162. As described further below, the stylus pen 160 and sensors 120, 150 can include numerous hardware devices for capturing biometric properties associated with the user, including, but not limited to, fingerprints (using fingerprint sensors in the stylus), facial imaging (using cameras, such as are included in sensors 120), voice recognition (using microphones, such as are included in AI voice recognition 150), etc. Thus, two or more different sensors can collaborate to provide identification information of the user. Metric (i.e., measurable) properties can also be used to identify the user including grip (finger positioning sensors in the stylus), pressure (pressure sensors in the stylus), angle of the stylus during use (gyroscope in the stylus), speed of writing (timer in the stylus) and changes in writing speed (accelerometer in the stylus). Typically, the stylus pen 160 communicates with a digitizer below the screen 116 to transmit the identification information to an operating system running in the multi-user display. Other information can also be communicated to the operating system, such as camera data. The camera data can be used to assist in identification, angle of the stylus during use, and other metrics described above.

When a touch command is detected as shown at 162, fingerprint (and/or other biometric) analysis can be used to identify the user performing the command. Fingerprint analysis can also identify which individual finger of the user is touching the screen and the orientation of the finger. This information can be used to analyze if two users simultaneously touch a region of the board and the finger orientation can indicate which finger belongs to which user. Detection of a user means that the presence of a user is determined, with any varying degree of ability to identify the user. Thus, detection can include just knowing a relative position of a person, without knowing the actual identity of the person, or knowing the position and the identity of the person so that personal information can be obtained from a database.

When a stylus pen 160 is handed off between user A and user B, it indicates a relationship between the users, whether it be work colleagues or friends. Such an identification of a relationship can be leveraged by using any of the above-identified sensors that are in the environment 100, including the sensors 120 and the stylus pen 160. For example, an operating system can detect that user A's fingerprint was present during a first time period and user B's fingerprint was present during a second time period. Thus, when different users are detected holding the stylus pen 160, it indicates that a pen handoff occurred. At that point, the operating system can change state so as to adapt the user experience for either or both the user receiving the pen and the user delivering the pen. The adapted user experience can include establishing a communication channel between personal devices 130, 132 or 130, 134. Such a communication channel can be established through Bluetooth or other wireless communication channel, or through a network communication channel. Adapting the user experience can also include changing the UI in some way, such as how new applications are launched, opening new application windows, the position of where application windows open, etc. Additionally, the AI voice recognition 150 can adapt its behavior by giving priority to the active user of the stylus pen. Thus, information from the meeting can be treated as if the active user is the leader of the meeting. The leader can be given priority on setting agenda items, calendaring meetings, inviting other team members, etc. Other behavioral adaptations can include attributing notes to users, changing language models based on who is talking, etc.

Figure 2:
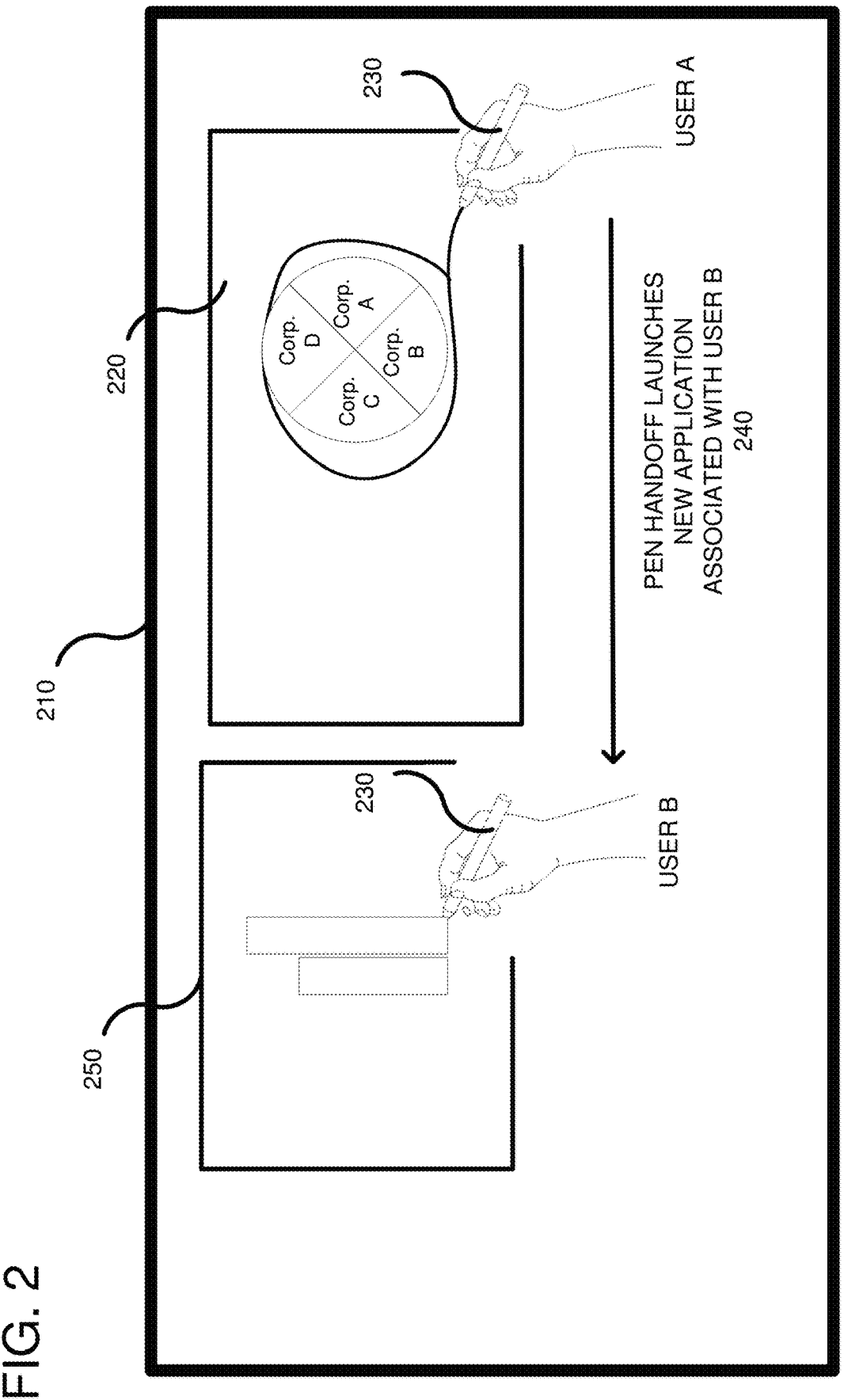
FIG. 2 is a diagram wherein multiple users interact with a multi-user display with a pen handoff resulting in a new application window opening.

FIG. 2 shows a multi-user display 210 wherein a user A has an open application window 220 and is inputting data into the application using a stylus pen 230. As indicated at 240, user A hands-off the stylus pen 230 to user B. The multi-user display 210 detects that user B is now the active user of the stylus pen 230. As a result, a new application window 250 is automatically opened and user content associated with user B is automatically displayed. Thus, as a result of changing the active user of the stylus pen 230, the multi-user display 210 adapts functionality associated with the user interface of the multi-user display 210. Other functionality associated with user B can include automatically changing a digital ink color that is displayed when user B writes data into the application window 250. Other digital ink properties can also be changed including, but not limited to, a width of the ink stroke, a brush style (e.g., calligraphy, blotting with pressure, pencil mode vs. pen mode, fat marker vs. ball point pen, etc.). Other example changes in functionality can be controlled through button action mappings. Such adaptations in functionality can be stored in a user profile as customization options that occur upon a pen handoff. Identification of user B can also result in the multi-user display obtaining profile data associated with user B such as handwriting patterns, knowing whether user B is left-handed or right-handed, etc. Knowing the handwriting patterns of a user allows the system to display the user's handwriting in a more consistent manner. Thus, if a user makes a letter more sloppy than usual, the multi-user display 210 can change the letter so that it appears like the same letter stored within the user's profile. Understanding whether a user is left-handed or right-handed allows the system to better interpret the handwritten data entered into the application window. For example detection of a user's palm is useful so as to ignore where the palm touches the multi-user display screen.

Example Digitizer

Figure 3:
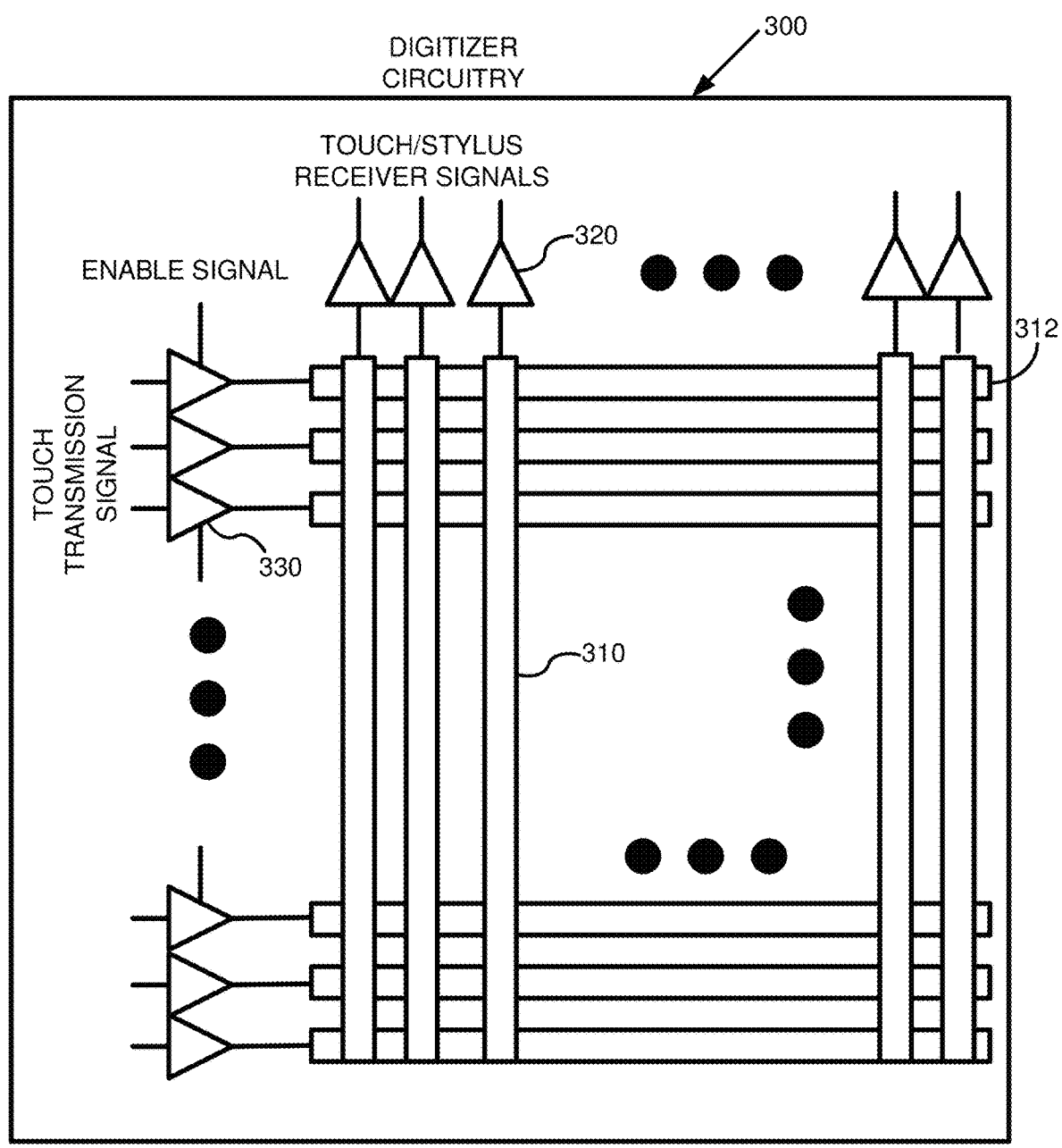
FIG. 3 is an example of a digitizer circuit used in conjunction with the multi-user display to receive touch and stylus signals.

FIG. 3 shows a digitizer circuit that can be used to detect stylus pen signals associated with the multi-user display. Typically, the digitizer circuit is positioned directly behind the display screen, which includes the outer glass. The digitizer converts analog signals into digital signals. For example, user interface actions, such as presses or swipes on a touch screen are converted to digital signals to allow a user to write, erase, or move content displayed on the touch screen. The stylus pen typically includes a first end, called a stylus tip, for writing content and a second end for performing a digital erasure of the content. As further described below, the stylus pen tip and/or eraser end can transmit signals to the multi-user display so as to operate as a user input device. When the stylus pen is detected, it can switch to one of a plurality of candidate protocols, without interaction from the user, so as to communicate with the digitizer. The stylus pen can then dynamically set a protocol used to communicate with the digitizer that matches the protocol expected by the digitizer. Setting the protocol can impact the waveforms generated by the stylus pen. For example, transmit and receive time slots can conform to the selected protocol, as well as the transmit modulation. Finally, the stylus pen can enable components that are supported by the selected protocol or the specific digitizer.

FIG. 3 shows a digitizer circuit 300. The digitizer circuit 300 includes a plurality of electrodes including column electrodes 310 and row electrodes 312. The columns are positioned above the rows with a gap there between so as to form a capacitance between each column and row. The capacitance between the columns and rows of electrodes changes when a finger or stylus comes in contact with a surface of the digitizer. A plurality of receiver circuits 320 can be used to sense the changing capacitance, which indicates a location of the user's finger or the stylus on the digitizer. The digitizer 300 further includes a plurality of transmitters 330, one per row of electrodes 312, for transmitting touch signals on the electrodes in a scanned pattern. The transmitted touch signals are received on the column receivers 320 so as to detect any change in capacitance. The column electrodes 310 can also receive stylus pen signals when the stylus pen is brought in contact with the digitizer surface. A location of the stylus pen can be determined based on which column electrode 310 is receiving the strongest stylus signal.

Example Stylus Pen Circuits

Figure 4:
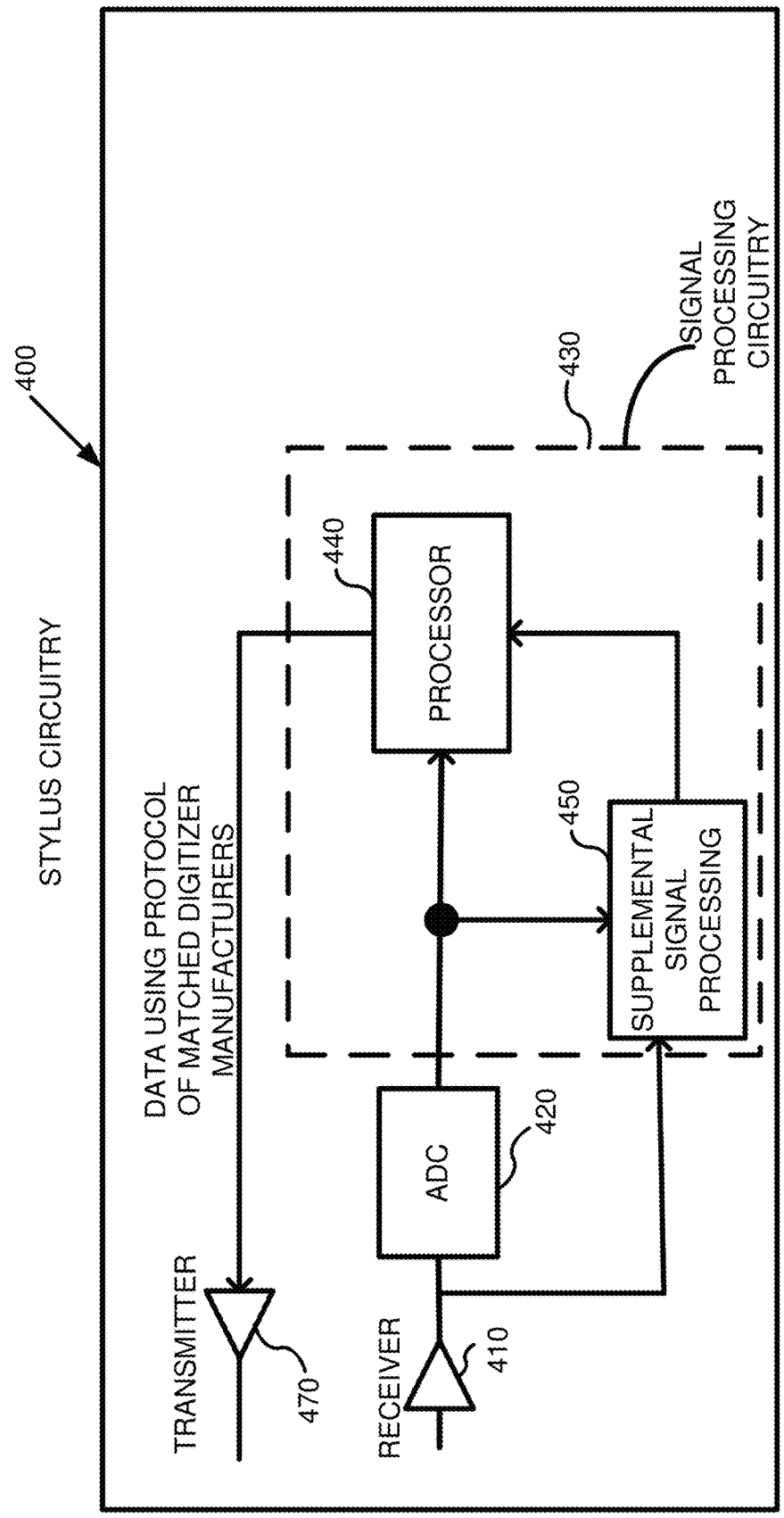
FIG. 4 is an example hardware circuit used in a stylus pen.

FIG. 4 shows a first embodiment of stylus pen circuitry that can be used to analyze a digitizer's touch signals. The stylus circuitry 400 includes a receiver circuit 410 configured to receive wireless touch signals in analog form from a digitizer (FIG. 3), which is positioned near the stylus pen. An Analog-to-Digital Converter (ADC) 420 is coupled to an output of the receiver in order to convert the analog touch signals to digital for processing by the stylus circuitry 400. The output of the ADC is coupled to the signal processing circuitry 430 that includes a processor 440 (which can be a general processor, an ASIC, or a microcontroller) and any desired supplemental signal processing circuitry 450. The processor 440 is coupled to the supplemental signal processing circuitry 450 such that the processor 440 can receive a variety of different data related to the characteristics of the touch signals received from the digitizer. The supplemental signal processing 450 can also be directly coupled to the receiver 410 so that the supplemental signal processing 450 can process the amplified signal directly without needing the ADC. As further described below, the characteristics received from the ADC 420 or the receiver 410 can relate to either time-based or frequency-based characteristics of the touch signals including rise times of the touch signals, pulse characteristics of the touch signals, frequency characteristics of the touch signals, etc. The processor 440 can communicate with the digitizer via a wireless transmitter 470 using a selected protocol. Generally, the processor 440 transmits data (such as stylus-related data) to the digitizer using the protocol. For example, the stylus-related data can include a serial number of the stylus, pressure data, the state of any buttons on the stylus, battery level data, and Inertial Measurement Unit (IMU) data. The IMU can be used to retrieve data about force, angular rate, and magnetic field surrounding the stylus pen. Additionally, accelerometers, gyroscopes and magnetometers within the IMU can be separately used. Additional information can include information associated with identifying the user, such as metric or biometric data described further below in relation to FIG. 5.

Figure 5:
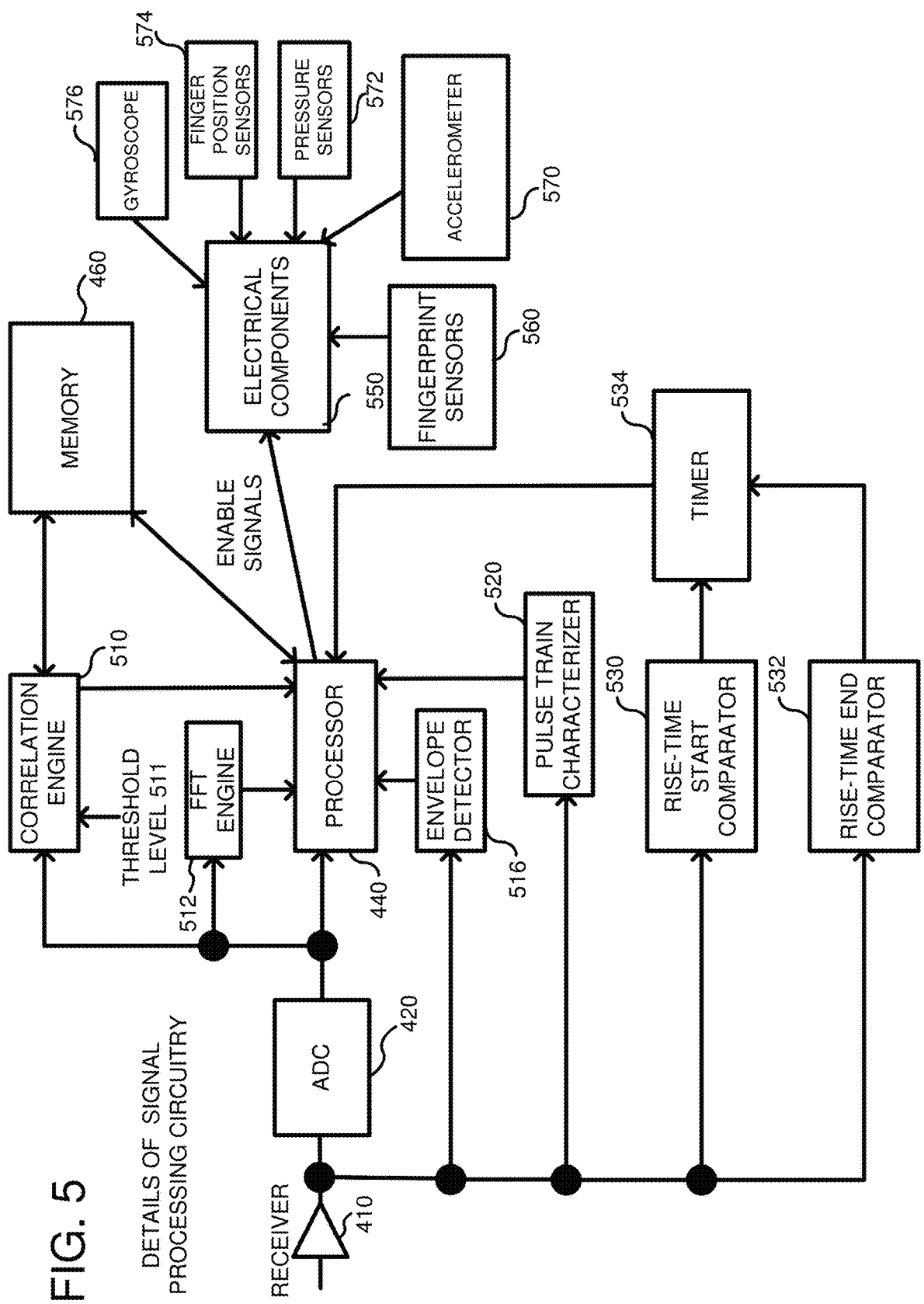
FIG. 5 is another example showing further details of a hardware circuit used in a stylus pen with multiple hardware components to assist in identification of an active user.

FIG. 5 shows further details of the signal processing circuitry 430 from FIG. 4. The receiver 410 and ADC 420 (from FIG. 4) are repeated for clarity. The receiver 410 receives touch signals from a digitizer as previously described. Those touch signals are converted to digital by the ADC 420. The output of the ADC can be supplied to multiple different hardware and/or software components used to perform signal processing on the touch signals. For example, the processor 440 itself can perform some or all of the signal processing that is shown as performed by other components. Other components can be coupled directly to the receiver 410 without passing through the ADC. A correlation engine 510 is coupled to the output of the ADC 420. The correlation engine 510 correlates data between the detected touch signals and signatures that are stored in the memory 460 of the stylus pen. The correlation engine 510 can perform a variety of correlation-type functions, such as comparing points in the received wave form to points in the stored wave form in order to detect a similarity between the wave forms. If the similarity exceeds a threshold level 511, then the correlation engine determines that a match is found. The threshold level 511 can be based on a constant or can be programmed by the user. The correlation function performs a point-to-point multiplication and adds the result to generate the correlation output C. The higher the output of the correlation function, the more likely that the two functions are correlated. If the correlation function output exceeds the threshold level 511, then the touch signal is determined to match the signature in memory.

A Fast Fourier Transform (FFT) engine 512 can be used in addition to the correlation engine 510 or as an alternative to the correlation engine. The FFT engine 512 receives the touch signals from the ADC 420 and performs frequency analysis on the touch signals. In particular, as described further below, different manufacturers can have different frequency spectrums associated with their touch signals. For example, some vendors may use different frequencies, implying their respective FFTs will have dominant peaks in different locations. In some cases, the FFT engine may also be used to distinguish between digitizers operating at the same fundamental frequency, if their harmonics have different amplitudes (e.g., due to drivers with different slew rates). The FFT output can be passed to the processor 440, which can compare the output from the FFT engine 512 to signature frequency data stored in the memory 460. Based on the comparison, an identification of the digitizer can be made.

An envelope detector 516 can be coupled to the output of the receiver 410 to perform envelope analysis on the input touch signals. The envelope detector 516 can track peaks in the input touch signals and, depending on a time constant, can either track individual peaks of a series of pulses or of a general shape of the series of pulses. The output of the envelope detector 516 can be passed to the processor 440 for analysis. In particular, the processor can compare various pulse characteristics determined by the envelope detector 516 with stored pulse characteristics within the memory 460. If the pulse characteristics match, the processor can use the memory 460 to retrieve the digitizer's make and model. Specifically, the data record within the memory 460 can store both the digitizer's make and model with the signature data associated with the digitizer so that when a signature is matched, the make and model can be retrieved. Additionally, the same data record can store information associated with a protocol to use with the digitizer. The information can be individual parameters or configuration settings.

A pulse train characterizer 520 can be coupled to the receiver 410 in parallel with the correlation engine 510, the Fast Fourier Transform engine 512 and the envelope detector 516. The pulse train characterizer 520 can include timers and comparators used to measure pulse width, pulse train length, and the pulse train period. Such characteristics of the pulses or combinations of pulses that make up the touch signals can be used as a signature to detect the type of digitizer generating the touch signals. Other pulse-related characteristics can be used, such as a number of pulses, an amplitude of the pulses, and a length of gaps between pulses.

The signal processing circuitry can further include a rise-time start comparator 530, a rise-time end comparator 532, and a timer 534. The rise-time start comparator 530 and rise-time end comparator 532 are coupled in parallel to the receiver 410 for receiving the touch signals. As soon as a first pulse of a touch signal is received, the rise-time start comparator starts the timer 534, such as on a rising edge of the pulse. When the pulse reaches its maximum amplitude, the rise-time end comparator 532 turns off the timer 534 so that the timer accurately reflects a rise time of the pulses associated with the touch signals. The timer output can be coupled to the processor 440 which can then compare the rise time to stored rise times in the memory 460. As a result, the rise times represent a signature of the touch signals that can be compared to known signatures stored in memory for identifying the manufacturer, model or configuration of the digitizer. Additionally, such timing can be correlated to a user's typical patterns so as to assist in identifying a user.

Using one, multiple or all of these various signal processing components, the processor can identify which digitizer generated the touch signals that were received on the receiver 410. The processor can then select a protocol that is suitable for communication with the detected digitizer and can further enable electrical components 550 on the stylus pen. The electrical components can be a variety of different components and/or features that may only be supported by a specific protocol or manufacturer, such as Bluetooth or other sensors on the stylus. Coupled to the electrical components 550, or incorporated therein, are different hardware functions that can be used to identify an active user of the stylus pen. For example, fingerprint sensors 560 can include a pad (not shown) on an external body of the stylus pen. The fingerprint sensor 560 serves to identify the user of the stylus pen with a high degree of certainty. The fingerprint sensor includes an electronic device used to capture a digital image of the fingerprint pattern. The captured image, called a live scan, can be digitally processed to generate a biometric template used for pattern matching. Various patterns of known users can be stored in the memory 460.

The accelerometer 570 can be used to detect a user's characteristics when the stylus pen starts or stops when writing words. Different users typically start and stop at different speeds allowing the accelerometer to assist in identifying a user. The pressure sensor(s) 572 detects how much force a user exerts while holding the stylus pen. Again, such pressure sensing can assist in identifying a user. The finger position sensors 574 can be used to detect how a user holds the stylus pen, such as a distance between a forefinger and a thumb. Such a characteristic can be used as an identification factor. Finally, the gyroscope 576 can be used to determine an angle a user holds the pen, which is also an identifying characteristic. Using one or more of such identification circuits, the stylus pen can determine when a handoff of the stylus pen occurs. Other sensors can be separately used or integrated into the sensors described above, such as capacitive sensors, transducers and ultrasound. For example, with ultrasound, both continuous wave and pulsed ultrasonic signals can be used to determine distance or position of the stylus pen. With capacitive sensors, a user's finger position can be determined. Moreover, a particular identification of the user can be determined. The identification information, or the collected data, can be passed to the multi-user display via a wireless signal, which can have access to additional processing power, such as through a network so that an identification can be made. If the user is identified, profile information can be obtained from the network and used in interpreting the user's handwriting or otherwise performing actions associated with the user, such as retrieving data for launching the user's applications or other personal data.

Example Display System

Figure 6:
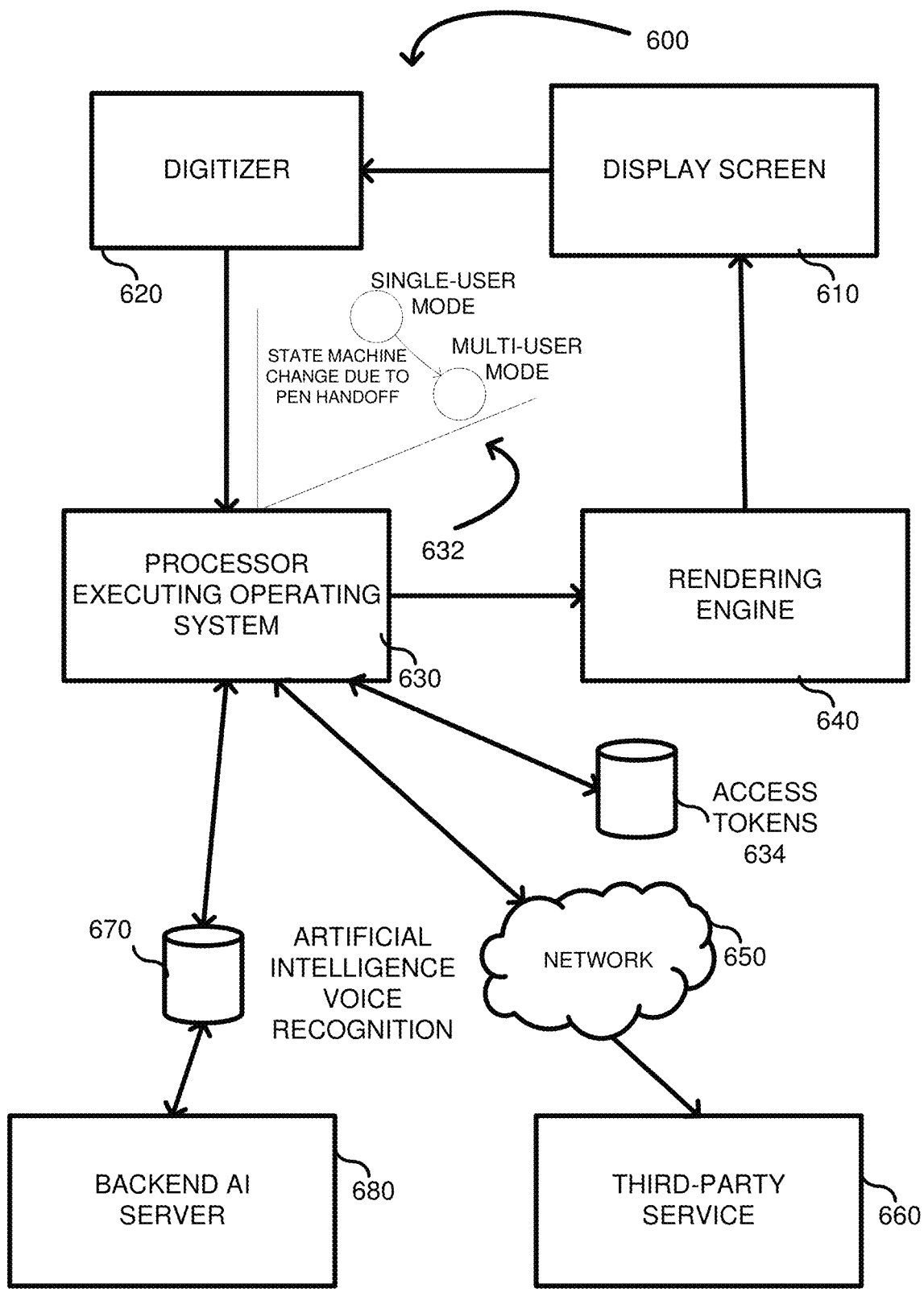
FIG. 6 is an example environment showing components of the multi-user display in conjunction with other services coupled to the multi-user display.

FIG. 6 illustrates an example display system 600 including a display screen 610. The display screen can be any of a variety of screens, including, but not limited to light emitting diode (LED) screens, liquid crystal screens, electroluminescent screens, plasma screens, and/or other developing or yet to be developed display and screen types. Typically, the display screen 610 is an outer glass piece that users touch with their fingers or with a stylus pen. Capacitive effects of the user interaction with the display screen 610 can be captured by a digitizer 620. As described above, the digitizer includes multiple rows and columns of electrodes that can be used to detect capacitive effects of a stylus. The digitizer 620 can be used to transform analog signals to digital signals so as to capture a location of the stylus pen.

A processor 630 can be coupled to the digitizer 620 and executes an operating system for controlling the display system. The processor can be a general-purpose central processing unit (CPU), processor in an application-specific integrated circuit (ASIC), or any other type of processor. As shown at 632 when there is a change in the active user of the display screen 610, the operating system changes state of a state machine shown in part at 632. The change in state of the operating system results in adapting functionality of the multi-user display. As described earlier in relation to FIGS. 1 and 5, identification signals can be transmitted from any of a variety of electrical components (fingerprint sensors, accelerometer, gyroscope, etc.) so as to identify that an active user of the stylus pen has changed. In the example shown at 632, the operating system can change state due to the pen handoff from a single-user mode to a multi-user mode. Other changes in functionality are further described herein in relation to other figures. However, in all cases, adapting functionality means that the operating system state transitions from one state to another in response to the pen handoff. Thus, two states are shown as a minimal example of a much larger state machine. The operating system executing on the processor 630 can then transmit display data to a rendering engine 640, which displays the display data on the display screen 610.

The operating system executing on the processor 630 can also communicate via a network 650 to third-party service 660. The network 650 can be any type and/or form of network and may include any of the following: a point-to-point network, a broadcast, local area or wide area network, a telecommunications or data communication network, a computer network, an ATM (Asynchronous Transfer Mode) network, a SDH (Synchronous Digital Hierarchy) network, a SONET (Synchronous Optical Network) network, a wireless network and a wired network. The network can also include a wireless link, such as a satellite band or an infrared channel.

The third-party service 660 can be, for example, a social network, such as a social networking site. If the operating system detects a change of active users, the operating system can transmit a request to establish a relationship between the active user of the stylus pen and the previous active user of the stylus pen. For example, because both users are communicating using a same display screen 610 and they are sharing a stylus pen, the operating system assumes that the users are colleagues or friends. In some embodiments, the stylus pen can provide identifiers for the new active user and the previous active user. The identifiers can be correlated to user-specific data stores 634 of access tokens to third party services (e.g. OAuth2 tokens to LinkedIn®, Facebook®, etc.). The tokens can be populated in the database based on explicit user authorization to access a third-party service. The tokens are correlated to user identifiers. With knowledge of the two identities involved in the handoff interaction, a detection of a handoff of the stylus pen results in an API request (e.g. HTTP request to a REST API) to the third-party service on behalf of one of the two users to "connect" the users using the correlated access token. Connecting the users includes that content associated with each user's account can be shared with the other user. Third-party services can then track interactions between people for the purposes of sales, networking, relationship management, etc.

The third-party service can be replaced with an enterprise-based service or a local (on system) service. An example local service can be that a shared device pre-caches content of another user while a current user is active, based on their interaction history. For the enterprise service, an enterprise can intelligently understand how their employees interact with each other and deduce work performance metrics given some interaction history.

The operating system can also be coupled through a network, for example, to an AI voice recognition engine 670. The engine 670 can communicate with a backend AI server 680 to assist in identifying speech patterns and voice commands so as to identify which user in a meeting is speaking and to make intelligent decisions about action items that can be implemented. The operating system can pass user identifiers to the engine 670 associated with the recent active users of the system. The backend AI server 680 can then use the identifiers to determine which user is the active user. The determined active user can be given a higher status when it comes to action items and setting calendared meetings.

Switching from Single-User Mode to Multiple-User Mode

Figure 7:
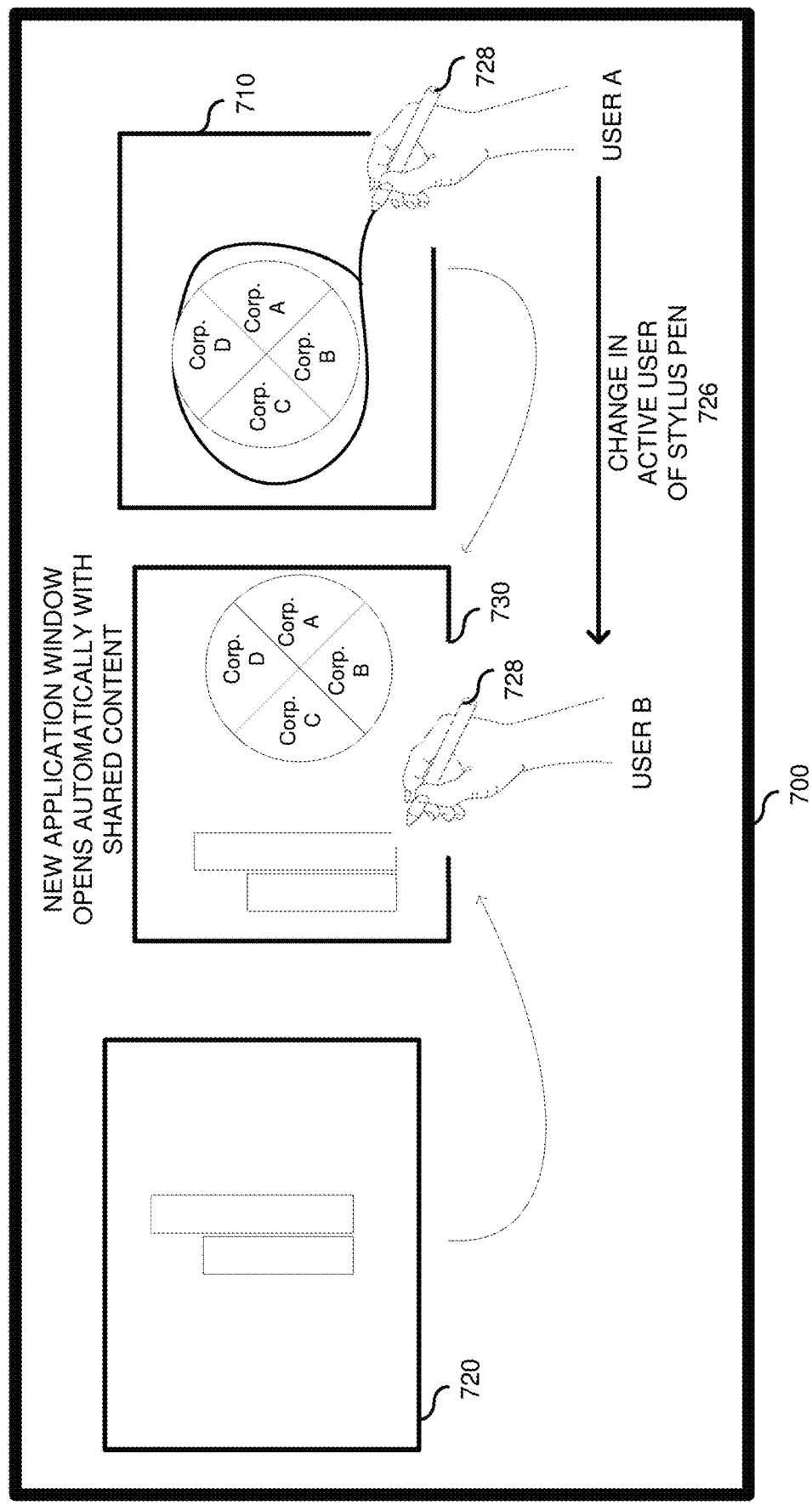
FIG. 7 is an example of opening an application window with shared content in response to handing a stylus pen to a different user.

FIG. 7 shows a multi-user display 700 wherein two users, user A and user B, previously interacted simultaneously on the multi-user display in application windows 710 and 720. At a point in time indicated at 726, a stylus pen 728 is handed over from user A to user B. As a result, the operating system detects that a pen handoff occurred so as to switch the active user from user A to user B. Such a detection occurs as a result of the operating system receiving identification signals from the stylus pen 728, which indicates user A using the pen during a first period of time and then the operating system receives identification signals indicating user B now has control of the stylus pen 728. In response, the operating system can automatically launch a shared application 730 at a position within a middle of the multi-user display 700 with shared content included therein, such as content associated with user A and content associated with user B. For example, some content from application window 710 and some content from application window 720 are moved into the shared application window 730. Thus, the operating system adapts the functionality of the multi-user display by automatically switching a user interface view in response to a change in the active user. By changing the user interface view, it is meant that application windows can be opened and moved so as to accommodate the change from a single-user mode to a multiple-user mode. For example, when the new application window 730 opened, the application window 710 could have moved to the right so as to accommodate the new window 730. Likewise, application window 720 could have moved to the left so as to open a gap between application window 720 and 710 sufficient for application window 730 to be displayed. Typically, application window 730 will be opened somewhere between where a user A and user B were previously interfacing with the multi-user display.

The application window 730 includes shared content. In the illustrated embodiment, the shared content includes content associated with user A and content associated with user B. Such content can be derived from open applications associated with each user or stored content associated with each user. Specifically user A and user B are each separately logged in to the multi-user display and each user has different access authority to stored information. Such stored information can be retrieved by the operating system of the multi-user display and presented in the shared application window 730. In some respects, the multi-user display can be considered a same display screen running different virtual computers in which both user A and user B are logged in. However, when a pen handoff occurs, the system automatically switches to a shared mode wherein both users are logged into a same virtual computer that is running the shared application window 730. Additionally, prior to the pen handoff 726, multiple application windows 710, 720 were in-focus, but the pen handoff switched the view such that application windows 710 and 720 were removed from focus and application window 730 was placed in-focus. Keyboard entries from either user A or user B (from personal devices) can then go directly into the shared content window 730. Thus, with user A and user B sharing an application canvas in which multiple applications are simultaneously running and in-focus, a stylus pen 728 handoff triggers a change in view of what is displayed in the multi-user display 700. The change of view can result in a change of rules for user input (both users input into the shared application window), a change of log-in status (both users are logged into a virtual computer executing a shared application 730), and a change in look and feel on the user display, as a new application window automatically opened. One example of a change of look and feel is that the new application 730 can be opened as a full-screen window to accommodate the shared aspect. Thus, in single-user mode smaller application windows can be opened, but in a shared, multi-user mode, larger application windows can be opened, and switching from the single-user mode to the multi-user mode can occur automatically by simply handing the stylus pen to a different user.

Establishing Relationships Between Users as a Result of Pen Handoff

Figure 8:
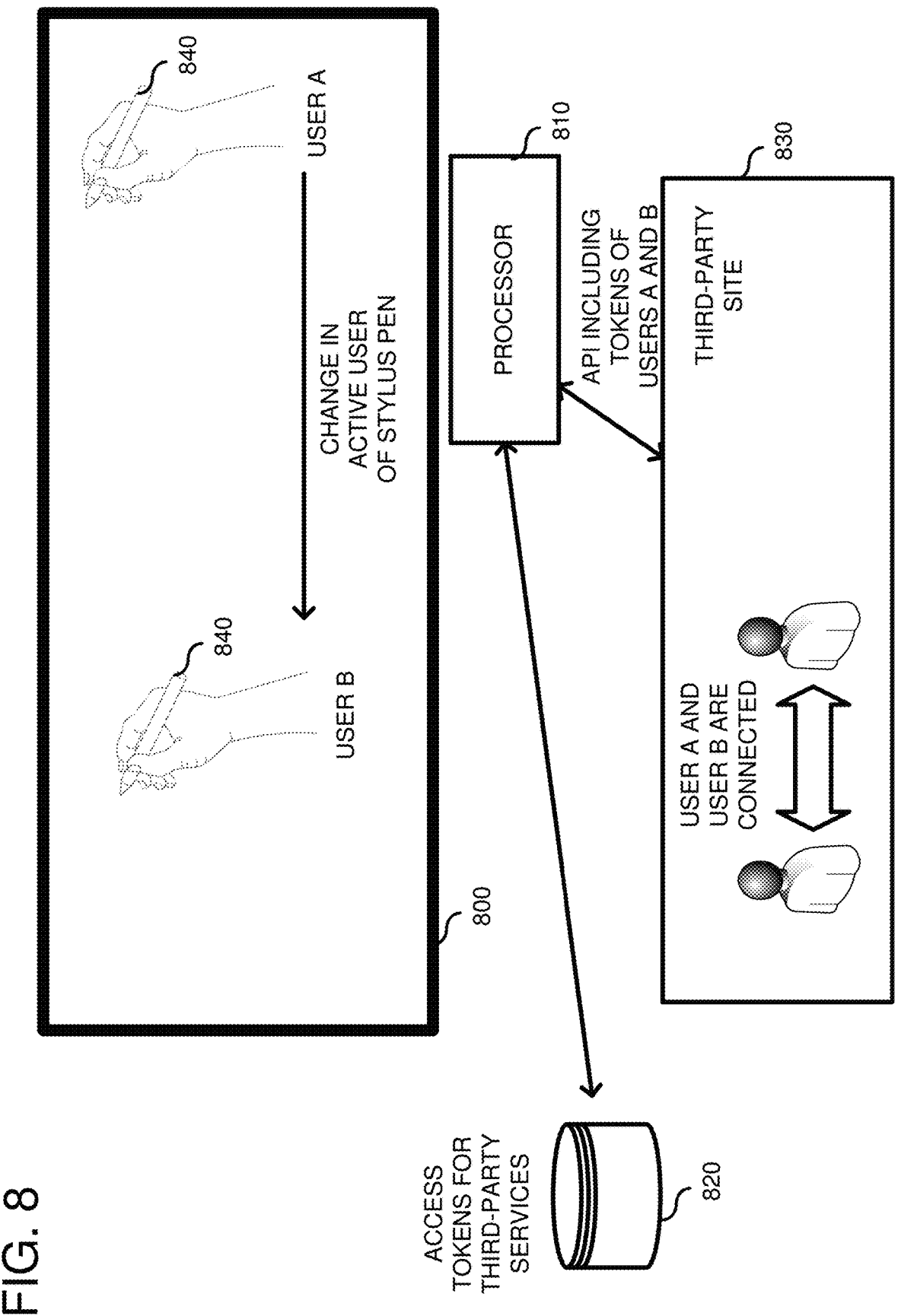
FIG. 8 is an example showing how third-party social media websites can be used in conjunction with a pen handoff.

FIG. 8 illustrates establishing a third-party relationship in response to a pen handoff. Establishing a relationship means that the users are able to, at least, share content electronically, such as through communication channels or using a third-party website. In some contexts, a pen handoff between the user A and user B can result in establishing relationships between these users outside of the context of the multi-user display 800. Previously it was described, in relation to FIG. 1, that a pen handoff can result in establishing a communication channel between personal devices of the users. For example, communication channels can be established between the users' laptops or smart phones. However, relationships can also be established between the users on third-party websites. For example a processor 810 associated with the multi-user display 800 can detect the change in active user of the stylus pen and correspondingly retrieve access tokens from database 820 associated with third-party services. The processor 810 can then generate an API including tokens of user A and user B to a third-party website 830. The API can request establishment of a connection between the user A and user B such that the users share content through the third-party social media site.

In a particular embodiment, the stylus pen 840 provides identifiers for the new active user and the previous active user. The identifiers can be correlated to user-specific data stores 820 of access tokens to third-party services (e.g. OAuth2 tokens to LinkedIn®, Facebook®, etc.). The tokens can be populated in the database based on explicit user authorization to access a third-party service. With knowledge of the two identities involved in the handoff interaction, a detection of a handoff of the stylus pen results in an API request (e.g. HTTP request to a REST API) to the third-party service on behalf of one of the two users to "connect" the users using the correlated access token. Third-party services can then track interactions between people for the purposes of sales, networking, relationship management, etc.

The third-party service can be replaced with an enterprise-based service or a local (on system) service. An example local service can be that a shared device pre-caches content of another user while a current user is active, based on their interaction history. For the enterprise service, an enterprise can intelligently understand how their employees interact with each other and deduce work performance metrics given some interaction history. Thus, collaboration between employees can be tracked and used in performance measurements to determine how collaboration impacts productivity. Collaboration, such as is indicated by a pen handoff, can be a more effective method of tracking two or more people working together. Other techniques, such as tracking meeting attendance (or other available metrics) can be less effective than tracking a pen handoff. For example, a pen handoff indicates active collaboration between users, whereas being in a meeting with multiple people is a location-based metric and does not necessarily mean that the people worked together.

Which third-party sites are chosen can be based on a location of the pen handoff. For example, the processor 810 can determine based on GPS coordinates that the multi-user display 800 is located in a work location. As such, the third-party website can be a business networking site. On the other hand, if the multi-user display is located in a social location, such as a restaurant, bar, resort, etc., the third-party website can be a social networking site. Thus, the processor 810 can select one of the multiple third-party sites based on the location of the multi-user display.

Changing User Interface View Based on Pen Handoff

FIG. 9 illustrates how the user interface can be modified as a result of a pen handoff. A top view of the multi-user display 900 in FIG. 9 illustrates a user interface 906 before a pen handoff from user A to user B. User A is shown working in an application window 910 which is the application in-focus prior to a handoff of a pen 912. A view of the user interface changes when user A hands the pen 912 to user B. The change in the user interface 906 can be seen in the bottom view of the multi-user display 900. In particular, the application window 910 shifted right on the user interface 906 so as to accommodate space for user B on the multi-user display. In some embodiments, the application window 910 can remain in-focus so that user a can continue to input data into the application. Additionally, a new application window 920 is opened for user B, which can also be in-focus simultaneously with application window 910. Thus, as a result of a pen handoff (transferring a user input stylus pen from one person to another), the user interface view can be modified. For example, application windows can be shifted right or left and new application windows can be opened to accommodate the new active user. Thus, switching the user interface view can mean any of the following: new application windows are opened, application windows are moved, or which applications are in-focus changes.

Other UI changes could also occur. For example, identification data of the users can be passed to the application and the application can use the identification information to obtain stored preferences for the user. Example preferences can include layout settings, display settings, language preferences, browser settings, desktop settings, etc.

Methods of Interacting with a Multi-User Display Based on Pen Handoff

Figure 10:
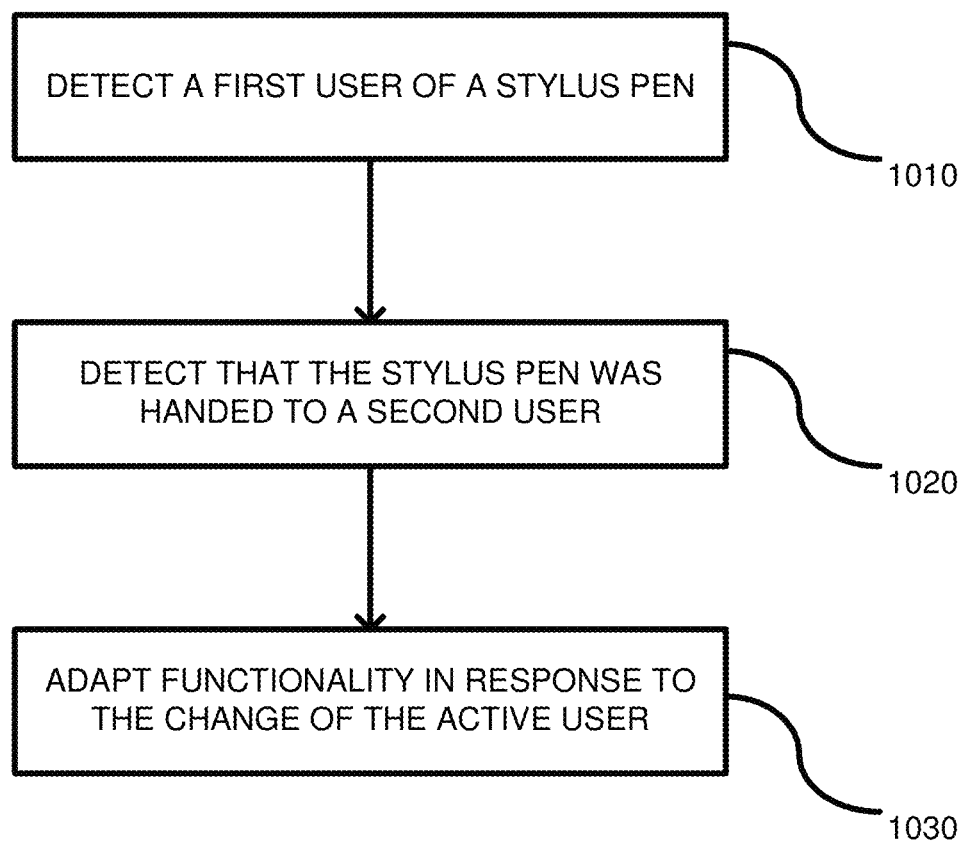
FIG. 10 is a flow chart according to one embodiment for adapting functionality of a multi-user display in response to a pen handoff.

FIG. 10 is a flow chart of a method of interacting with a multi-user display. In process block 1010 a first user of a stylus pen is detected. By detection, it is meant some level of identification is made to disambiguate one user from another. Such a detection can be accomplished through any of the electronic components described herein, such as fingerprint sensors 560 (FIG. 5), and accelerometer 570, pressure sensors 572, finger position sensors 574, and/or a gyroscope 576. The additional camera and voice sensors can also be used in the identification. Different levels of identification can be used to detect the first user. For example, knowing past history of an angle at which the user writes or a pressure that the user applies while writing can be used as a low-fidelity identification. Higher fidelity identification can also be used such as through fingerprint analysis which results in a high degree of certainty for identifying the user. Once the identification of the user is detected, it can be periodically checked and transmitted to a processor in the multi-user display. In this way, the multi-user display can track users of the stylus pen. One example method of detection can include the operating system reading all of the above identified sensors from the stylus pen and determining which sensors include identification information. The operating system can then apply weights to the different inputs in order to identify the user with varying levels of degree. For example, a highest weight can be given to a valid fingerprint, whereas lower weights are given to camera data.

In process block 1020, a detection can be made that the stylus pen was handed to a second user. Once the second user begins using the pen, the identification information captured by the stylus pen changes in accordance with the second user. The stylus pen can then transmit the new identification information to the processor within the multi-user display. The operating system associated with the multi-user display can then switch state based on such a detection of a change of the active user of the stylus pen. The changing state of the operating system results in adapting the functionality associated with the multi-user display in response to the change of the active user. The operating system can maintain a list of users of the stylus pen including which user is the active user, the active user being the user that currently inputs data into the multi-user display using the stylus pen. The list of users can be stored in a memory accessible by the operating system such as a memory within the processor running the operating system or within an external memory.

In process block 1030, functionality of the multi-user display is adapted in response to the change of the active user of the stylus pen. Adapting the functionality means that the user experience associated with the multi-user display changes. Adapting the functionality includes any of a variety of different functions that can be changed in the multi-user display. Some examples have been described herein and include automatically switching a user interface view of the multi-user display in response to the change of the active user. Changing the view of the user interface can include moving application windows or opening new application windows. Adapting the functionality can also include opening a user interface window that includes shared content between the first and second user. The new user interface window can have different permissions associated therewith than other open windows on the user interface. For example, multiple users can be considered logged into the new interface window, whereas other windows can have permissions for only a single user. Other adaptations of functionality include establishing a relationship automatically between the first and second users. Establishing the relationships can include connecting the first and second users on third-party social networking website or establishing a network connection between personal devices of the first and second users. Establishing relationships can further include establishing a trust relationship between users, which can impact functionality, such as allowing content to pass between the users. Adapting the functionality can further include changing functionality of an AI system based on the active user. Such adaptation of the artificial intelligence system includes performing voice recognition and treating commands from the active user as a different priority (e.g., a higher priority) than commands from other users. Other adaptations of the multi-user interface can also be made.

Figure 11:
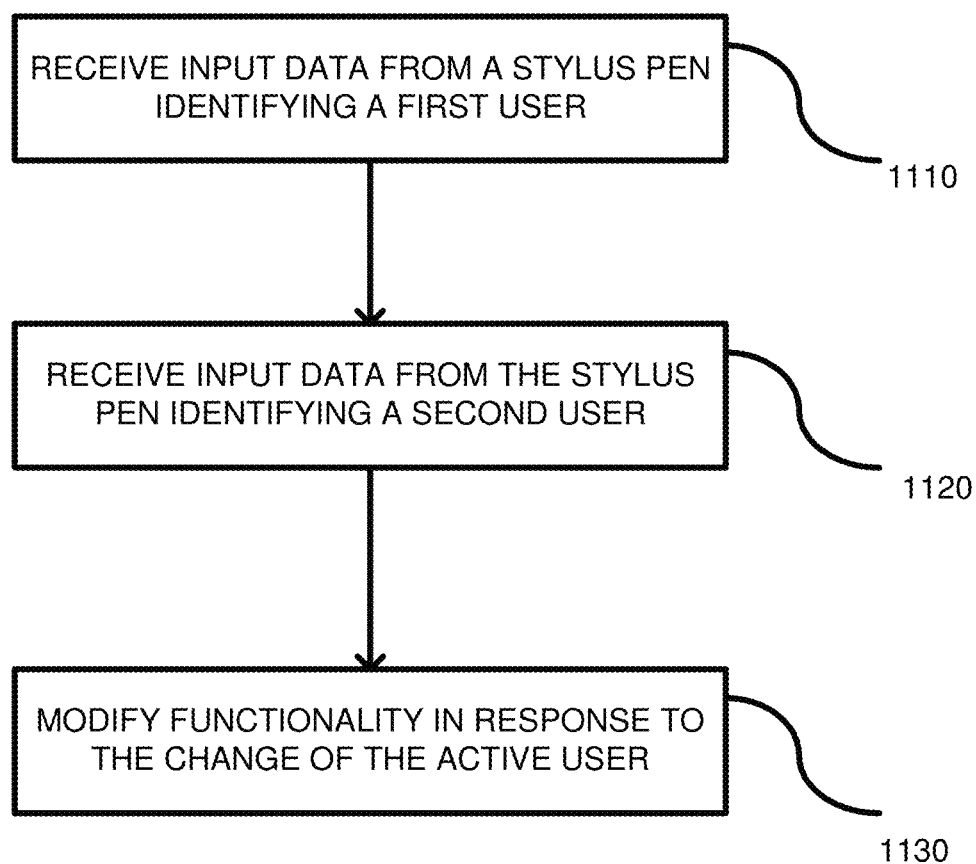
FIG. 11 is a flow chart according to another embodiment for adapting functionality of a multi-user display in response to a pen handoff.

FIG. 11 is a flow chart of a method according to another embodiment for interacting with a multi-user display. In process block 1110, input data is received from a stylus pen identifying a first user. In this example, the stylus pen can wirelessly transmit identification information obtained in relation to the active user. As previously discussed, the identification information can be obtained using a variety of hardware components available on the stylus pen. In process block 1120, input data can be received from the stylus pen identifying a second user, different than the first user. Identification of a second user close in time (e.g., less than 1 minute) to receiving identification information of a first user indicates that a pen handoff occurred. In process block 1130, in response to the change of the active user, functionality of the multi-user display can be modified. Modifying the functionality includes changing the user experience in association with the multi-user display. Such modified functionality includes switching from a single-user mode to a multi-user mode. Other modified functionality can include modifying a UI view being displayed on the multi-user display. Other adaptations in functionality have already been described herein.

Computing Systems

Figure 12:
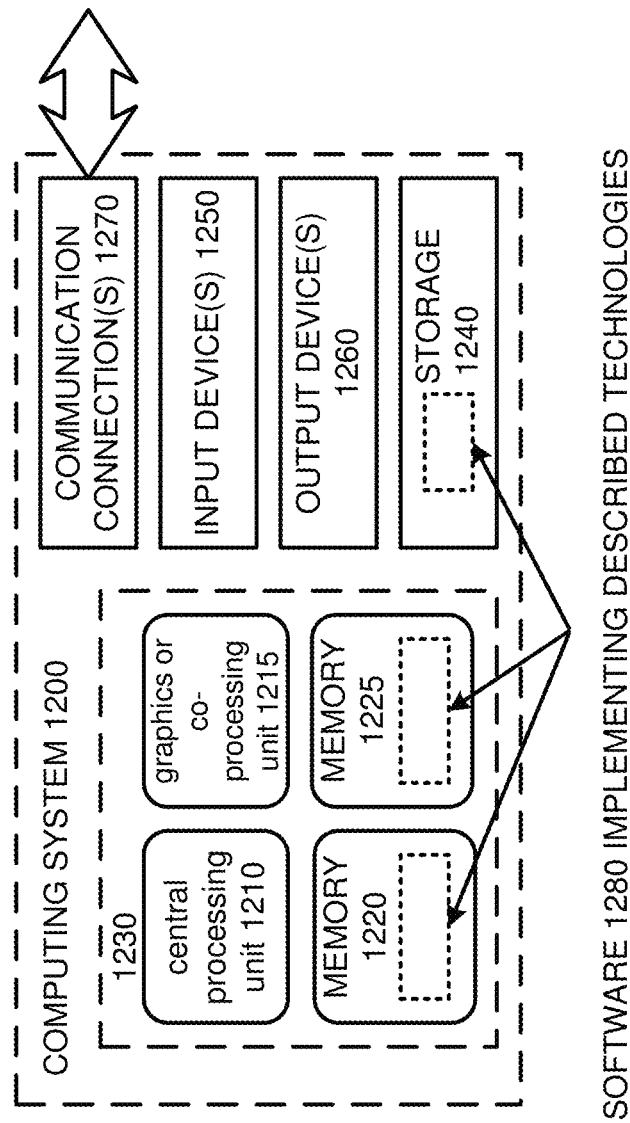
FIG. 12 is an example computing system which can be used to implement any of the embodiments described herein.

FIG. 12 depicts a generalized example of a suitable computing system 1200 in which the described innovations may be implemented. The computing system 1200 is not intended to suggest any limitation as to scope of use or functionality, as the innovations may be implemented in diverse general-purpose or special-purpose computing systems. The computing system 1200 can be used as the multi-user display.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. In the particular embodiments described herein, a stylus pen can be used as the input device. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Alternative Embodiments

Other embodiments can be derived from the following numbered paragraphs.

1. A method of interacting with a multi-user display, comprising:
    detecting a first user of a stylus pen using the multi-user display;
    detecting that the stylus pen was handed to a second user so as to change an active user of the stylus pen; and
    adapting functionality associated with the multi-user display in response to the change of the active user of the stylus pen.

2. The method of paragraph 1, wherein the adapting the functionality includes automatically switching a user interface view of the multi-user display in response to the change of the active user.

3. The method of paragraph 1 or 2, wherein the user interface window has a shared context involving the first and second users.

4. The method of paragraph 3, wherein the user interface window shares content between the first user and the second user.

5. The method of paragraphs 1-3, wherein the adapting the functionality includes establishing a relationship between the first and second user.

6. The method of paragraph 5, wherein the establishing the relationship includes automatically connecting the first and second users on a third-party social networking website.

7. The method of paragraph 5, wherein the establishing the relationship includes establishing a networking connection or trust relationship between personal devices of the first and second users.

8. The method of paragraphs 1-5, wherein the adapting the functionality includes changing functionality of an artificial intelligence system based on the active user.

9. The method of paragraph 8, wherein the adapting the functionality includes performing voice recognition and treating commands from the active user differently than commands from other users.

10. The method of paragraph 8, wherein adapting the functionality includes changing an operating system state in response to the change of the active user of the stylus pen.

11. A display system, comprising:
    a multi-user interactive display screen;
    a processor for receiving input data from the multi-user interactive display screen and from a stylus pen associated with a current active user of the stylus pen;
    memory coupled to or within the processor;
    the processor for performing a method, comprising:
    detecting a first user of the stylus pen at a first point in time;
    detecting a second user of the stylus pen at a second point in time indicating that an active user of the stylus pen changed from the first user to the second user;
    in response to the change of the active user of the stylus pen, modifying the functionality of the display system.

12. The display system of paragraph 11, wherein detecting the first user includes detecting identification information associated with the first user and detecting the second user includes detecting identification information associated with the second user.

13. The display system of paragraphs 11-12, wherein the modifying the functionality includes modifying a digital ink color associated with the active user.

14. The display system of paragraphs 11-13, wherein the modifying the functionality includes using profile information associated with the active user to modify handwriting patterns associated with the active user's handwriting so as to make it appear more consistent.

15. The display system of paragraphs 11-14, wherein the modifying the functionality includes switching a user interface to display a shared application window, the shared application window including content from the first user and from the second user.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of interacting with a multi-user display, comprising:
    detecting a first user of a stylus pen using the multi-user display;
    detecting that the stylus pen was handed to a second user so as to change an active user of the stylus pen; and
    adapting functionality associated with an operating system of the multi-user display in response to the change of the active user of the stylus pen, wherein the adapting functionality includes at least transitioning the multi-user display from a single-user mode wherein the first user is designated as the active user to a multi-user mode wherein the second user is designated as the active user.

2. The method of claim 1, wherein the adapting the functionality further includes automatically switching a user interface view of the multi-user display in response to the change of the active user.

3. The method of claim 2, wherein the user interface window has a shared context involving the first and second users.

4. The method of claim 3, wherein the user interface window shares content between the first user and the second user.

5. The method of claim 1, wherein the adapting the functionality further includes establishing a relationship between the first and second user.

6. The method of claim 5, wherein the establishing the relationship includes automatically connecting the first and second users on a third-party social networking web site.

7. The method of claim 5, wherein the establishing the relationship includes establishing a networking connection or trust relationship between personal devices of the first and second users.

8. The method of claim 1, wherein the adapting the functionality further includes changing functionality of an artificial intelligence system based on the active user.

9. The method of claim 8, wherein the adapting the functionality further includes performing voice recognition and treating commands from the active user differently than commands from other users.

10. A display system, comprising:
a multi-user interactive display screen;
a processor for receiving input data from the multi-user interactive display screen and from a stylus pen associated with a current active user of the stylus pen;
memory coupled to or within the processor;
the processor for performing a method, comprising:
    detecting a first user of the stylus pen at a first point in time;
    detecting a second user of the stylus pen at a second point in time indicating that the stylus pen has been handed off from the first user to the second user so as to change the active user of the stylus pen;
    in response to the change of the active user of the stylus pen, modifying the functionality of the display system upon which the stylus pen is being used, wherein modifying functionality includes at least processing touch-based signals received at the display system based on a first set of parameters when the first user is the active user of the stylus pen, and processing touch-based signals received at the display system based on a second set of parameters when the second user is the active user of the stylus pen, wherein the touch-based signals based on the first and second set of parameters are processed by the display system differently based on the active user of the stylus pen.

11. The display system of claim 10, wherein detecting the first user includes detecting identification information associated with the first user and detecting the second user includes detecting identification information associated with the second user.

12. The display system of claim 10, wherein the modifying the functionality further includes modifying a digital ink color associated with the active user.

13. The display system of claim 10, wherein the modifying the functionality further includes using profile information associated with the active user to modify handwriting patterns associated with the active user's handwriting so as to make it appear more consistent.

14. The display system of claim 10, wherein the modifying the functionality further includes switching a user interface to display a shared application window, the shared application window including content from the first user and from the second user.

15. The display system of claim 10, wherein the modifying the functionality further includes establishing communication channels between mobile devices coupled to the display system.

16. The display system of claim 10, wherein the modifying the functionality further includes transmitting a request to a third-party social media website to connect the first and second users.

17. A storage device for storing computer-executable instructions, the computer-executable instructions when executed by one or more processors perform a method comprising:
    receiving input data that a first user is a current active user of a stylus pen in association with a multi-user display;
    receiving input data from the stylus pen identifying a change in the active user of the stylus pen to a second user so as to indicate that the stylus pen has been handed off from the first user to the second user; and
    modifying functionality associated with an operating system of the multi-user display in response to the change of the active user of the stylus pen, wherein modifying functionality includes at least establishing communication channels between devices associated with the first and second users.

18. The storage device of claim 17, wherein the modifying the functionality further includes changing a user interface on the multi-user display to display shared content from the first and second users.

19. The storage device of claim 17, further including instructions for tracking collaboration between the first and second users.

* * * * *